United States Patent
Fan

(10) Patent No.: US 7,438,491 B2
(45) Date of Patent: Oct. 21, 2008

(54) MULTI-DIRECTIONAL CONNECTOR

(76) Inventor: Eagle Fan, No. 133, Cheng-Kung 6 St., Chu-Pei City, Hsinchu (TW)

( * ) Notice: Subject to any disclaimer, the term of this patent is extended or adjusted under 35 U.S.C. 154(b) by 192 days.

(21) Appl. No.: 11/428,407

(22) Filed: Jul. 3, 2006

(65) Prior Publication Data

US 2008/0003054 A1   Jan. 3, 2008

(51) Int. Cl.
*F16D 1/12* (2006.01)
*F16D 3/00* (2006.01)

(52) U.S. Cl. .................. 403/76; 403/115; 403/122; 403/128; 403/135

(58) Field of Classification Search .......... 403/2, 403/52, 56, 71, 76, 115, 122, 135, 141, 348, 403/128; 29/458, 527.1, 527.2
See application file for complete search history.

(56) References Cited

U.S. PATENT DOCUMENTS

| | | | | |
|---|---|---|---|---|
| 2,471,665 A | * | 5/1949 | Williams | 464/112 |
| 3,342,513 A | * | 9/1967 | Melton et al. | 403/77 |
| 4,266,883 A | * | 5/1981 | Riester et al. | 403/134 |
| 4,606,668 A | * | 8/1986 | Schmidt | 403/140 |
| 4,629,352 A | * | 12/1986 | Nemoto | 403/128 |
| 4,701,064 A | * | 10/1987 | Mizusawa | 403/71 |
| 4,898,490 A | * | 2/1990 | Herbermann et al. | 403/56 |
| 5,178,482 A | * | 1/1993 | Wood | 403/130 |
| 5,499,570 A | * | 3/1996 | Bergelin et al. | 92/84 |
| 5,921,694 A | * | 7/1999 | Herbermann | 403/56 |
| 6,338,589 B1 | * | 1/2002 | Kincaid et al. | 403/130 |
| 6,711,986 B2 | * | 3/2004 | Angione | 92/187 |
| 6,837,716 B1 | * | 1/2005 | Brazas | 439/8 |
| 6,860,671 B2 | * | 3/2005 | Schulz | 403/122 |
| 7,004,664 B2 | * | 2/2006 | Gras et al. | 403/133 |
| 7,188,563 B2 | * | 3/2007 | Liebig et al. | 92/187 |

* cited by examiner

*Primary Examiner*—Robert J. Sandy
*Assistant Examiner*—Nahid Amiri

(57) ABSTRACT

A structure for a ball-and-socket joint connector is provided, including a connecting element, an encasing unit and a fastening unit. The connecting unit includes a ball-shaped connecting element at one end. The connecting element is placed inside the encasing unit to form a ball-and-socket joint structure. The fastening unit is engaged to the outer circumference of the top of the encasing unit to fasten the connecting unit and the encasing unit after the adjustment. The connecting element includes two layers of materials with different hardness. The outer layer is softer than the inner layer so as to increase the friction between the connecting element and the encasing unit after the fastening unit is applied to fasten the connecting unit and the encasing unit.

8 Claims, 10 Drawing Sheets

MULTI-DIRECTIONAL CONNECTOR

FIELD OF THE INVENTION

The present invention generally relates to a multi-directional connector as a joint connecting two elements and capable of angle adjustment, and more specifically to a connector joint capable of enduring large external force while maintaining the adjusted angle between two jointed elements.

BACKGROUND OF THE INVENTION

The ball-and-socket joint is an ideal connector joint for connecting two elements because of the capability of providing multi-directional angle adjustment between the two connected elements. When it is desirable to lock-in the adjusted angle between the connected elements, the structure of such a ball-and-socket requires certain changes. As shown in FIGS. 1 and 2, the basic structure of ball-and-socket joints includes a connecting unit 71, an encasing unit 72, and a fastening unit 73. Connecting unit 71 includes a ball-shaped connecting element 711. The top of encasing unit 72 includes a plurality of holding plates 721 forming a concave ball-shaped seat 722. Connecting element 711 of connecting unit 71 is placed in ball-shaped seat 722. The outer surface of holding plates 721 includes screw teeth 723 to be engaged with inner screw teeth 731 of fastening unit 73 for pressing and fastening holding plates 721 to connecting element 711 after connecting unit 71 and encasing unit 72 are adjusted to the desired angle. The ball-and-socket joint connector is widely applied in a plurality of products, such as back mirror in a vehicle, adjustable resting seat for mobile phones, and so on.

To reduce the manufacturing cost, the components of a conventional ball-and-socket joint are made of hard plastic, including connecting unit, encasing unit and fastening unit. A disadvantage of using the same hard plastic as the manufacturing material is that the lock-in effect is the result of friction between holding plates and the connecting element, which maybe insufficient to stay fastened when a large external force is applied to turn the ball-and-socket joint. Therefore, the weak fixation effect limits the utilization of this conventional structure. It is imperative to develop an enhanced structure that will improve the lock-in effect while maintaining the multi-directional angle adjustment capability.

SUMMARY OF THE INVENTION

The present invention has been made to overcome the above-mentioned drawback of a conventional ball-and-socket joint. The primary object of the present invention is to provide a multi-directional connector with good fixation effect by improving the connecting element of the connecting unit so that the connecting element includes two layers with different hardness. The inner layer maintains the original hardness to bear the holding plates, while the outer layer is softer to increase the friction between the connecting element and the holding plates so as to improve the fixation effect.

To achieve the above object, the present invention provides a ball-and-socket joint with a structure including a connecting element, an encasing unit and a fastening unit. The connecting unit includes a ball-shaped connecting element at one end. The connecting element is placed inside the encasing unit to form a ball-and-socket joint structure. The fastening unit is engaged to the outer circumference of the top of the encasing unit to fasten the connecting unit and the encasing unit after the adjustment. The connecting element includes two layers of materials with different hardness. The outer layer is softer than the inner layer so as to increase the friction between the connecting element and the encasing unit after the fastening unit is applied to fasten the connecting unit and the encasing unit.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
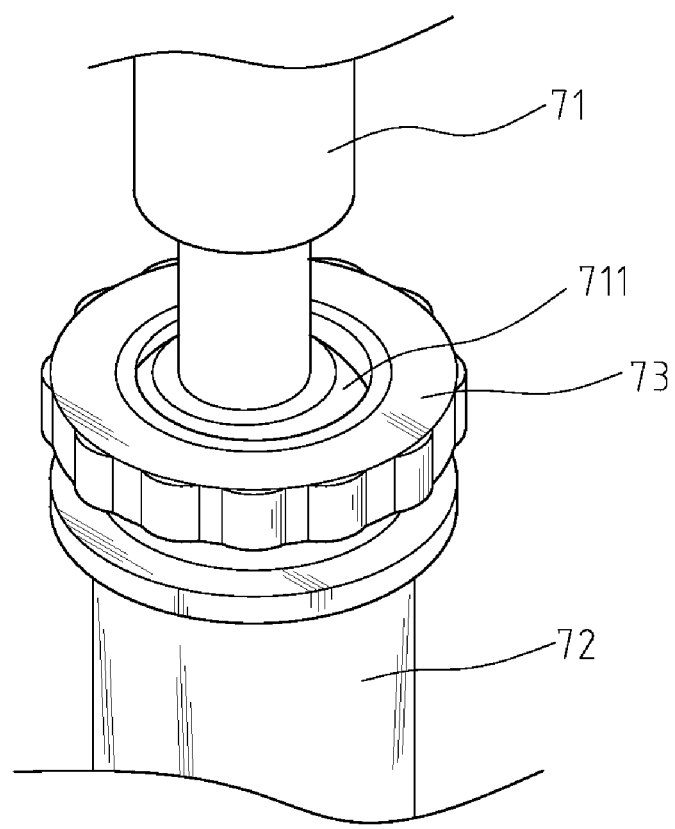
FIG. 1 shows a three-dimensional view of a conventional ball-and-socket joint connector.
Figure 2:
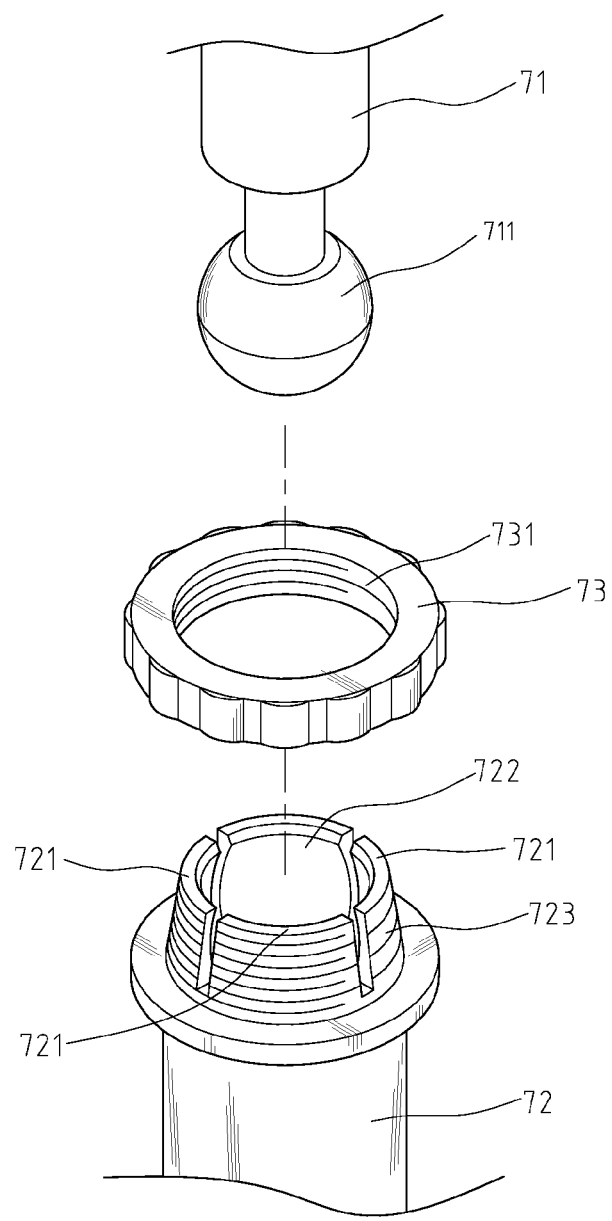
FIG. 2 shows an exploded view of a conventional ball-and-socket joint connector in FIG. 1.
Figure 3:
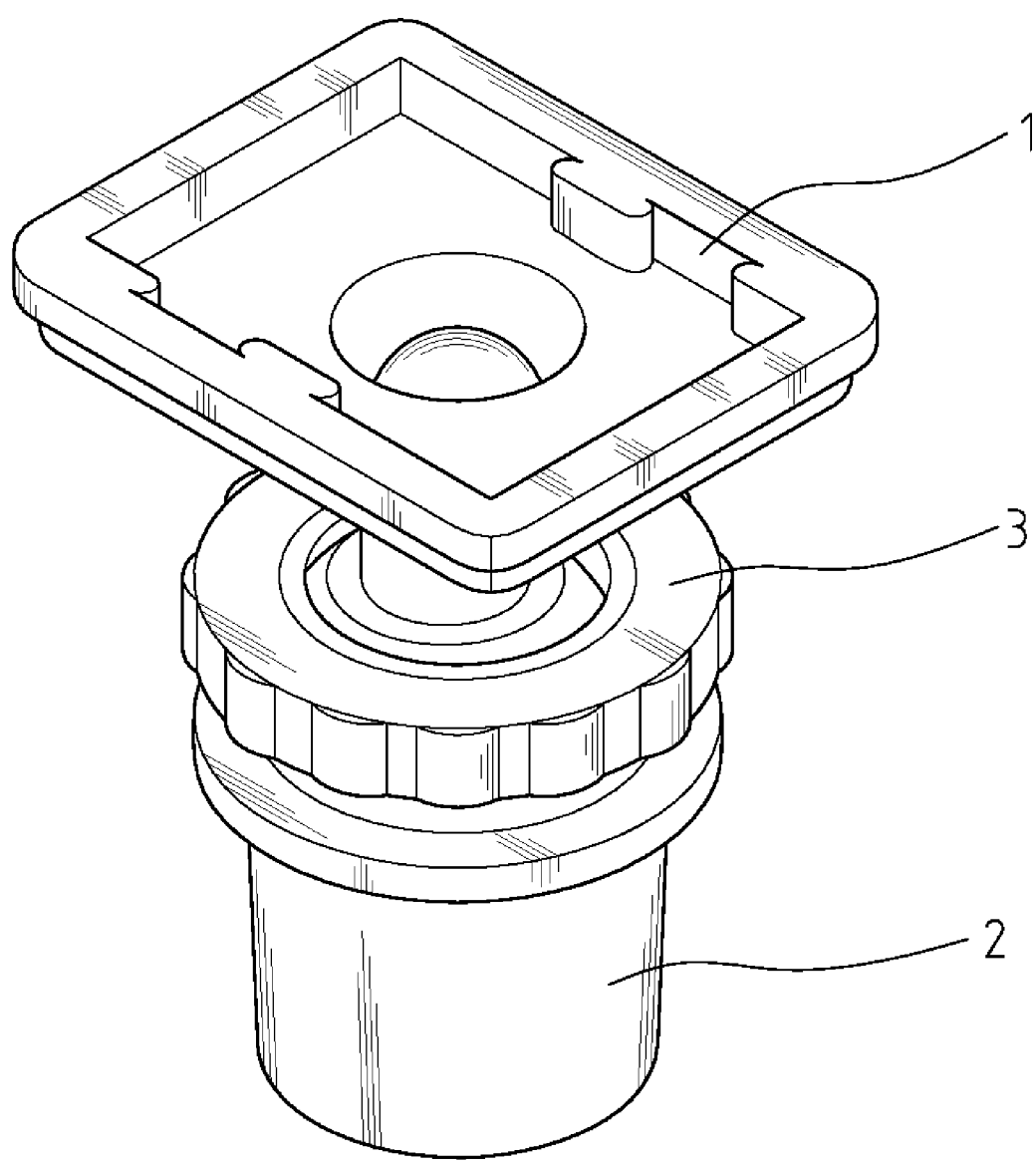
FIG. 3 shows a three-dimensional view of the present invention.
Figure 4:
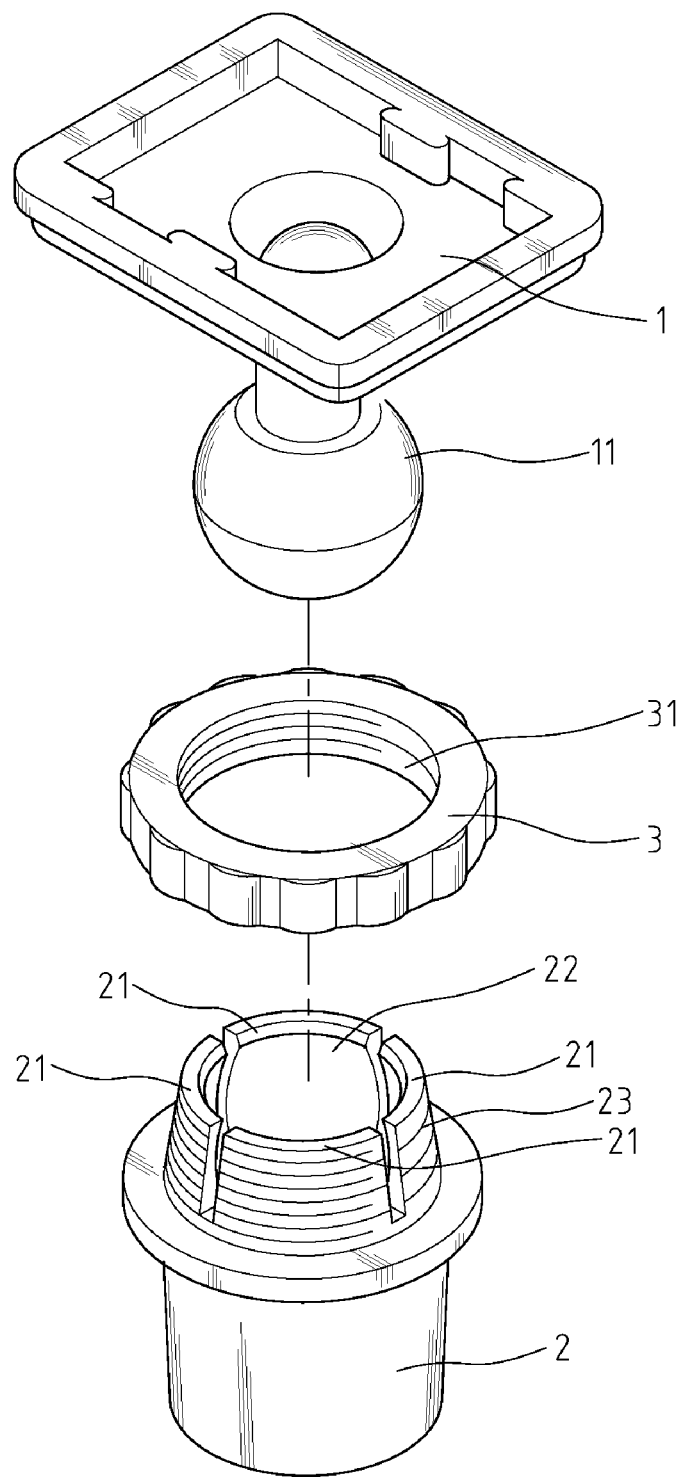
FIG. 4 shows an exploded view of the present invention.

FIG. 3 shows a three-dimensional schematic view and FIG. 4 shows an exploded view of the present invention. The multi-directional connector of the present invention includes a connecting unit 1, an encasing unit 2, and a fastening unit 3. One end of connecting unit 1 and one end of encasing unit 2 can be connected to any products to be joined by the present invention, or made into any form or product. The other end of connecting unit 1 is a ball-shaped connecting element 11. The other end of encasing unit 2 is a ball-shaped concave 22 formed by a plurality of holding plates 21. The shape of holding plates are curvy and narrower at the top and wider at the bottom so that holding plates 21 form a hemisphere. The outer circumference holding plates 21 includes screw teeth 23. Fastening unit 3 has a shape of a ring, with inner wall of the ring including screw teeth 31. When assembled, connecting element 11 is placed inside ball-shaped concave 22, and screw teeth 31 of fastening unit 3 are engaged to screw teeth 23 of holding plates 21 to fasten the structure, This is similar to the prior arts.

The improved feature of the present invention is the connecting element of the present invention includes two layers of material with different hardness. The outer layer is softer than the inner layer. Preferably, the outer layer of connecting element 11 is softer than the inner wall of holding plates 21 so that when fastening unit 3 fastens, holding plates 21 are pressed tightly against the outer layer of connecting element 11. Through the softer outer layer, the friction between holding plates 21 and connecting element 11 is greatly enhanced. Therefore, when the connector of the present invention is fastened, connecting unit 1 and encasing unit 2 will not turn or rotate easily by the external applied weight or force.

The following describes an embodiment to make a connecting element with two different layers of hardness.

Figure 5:
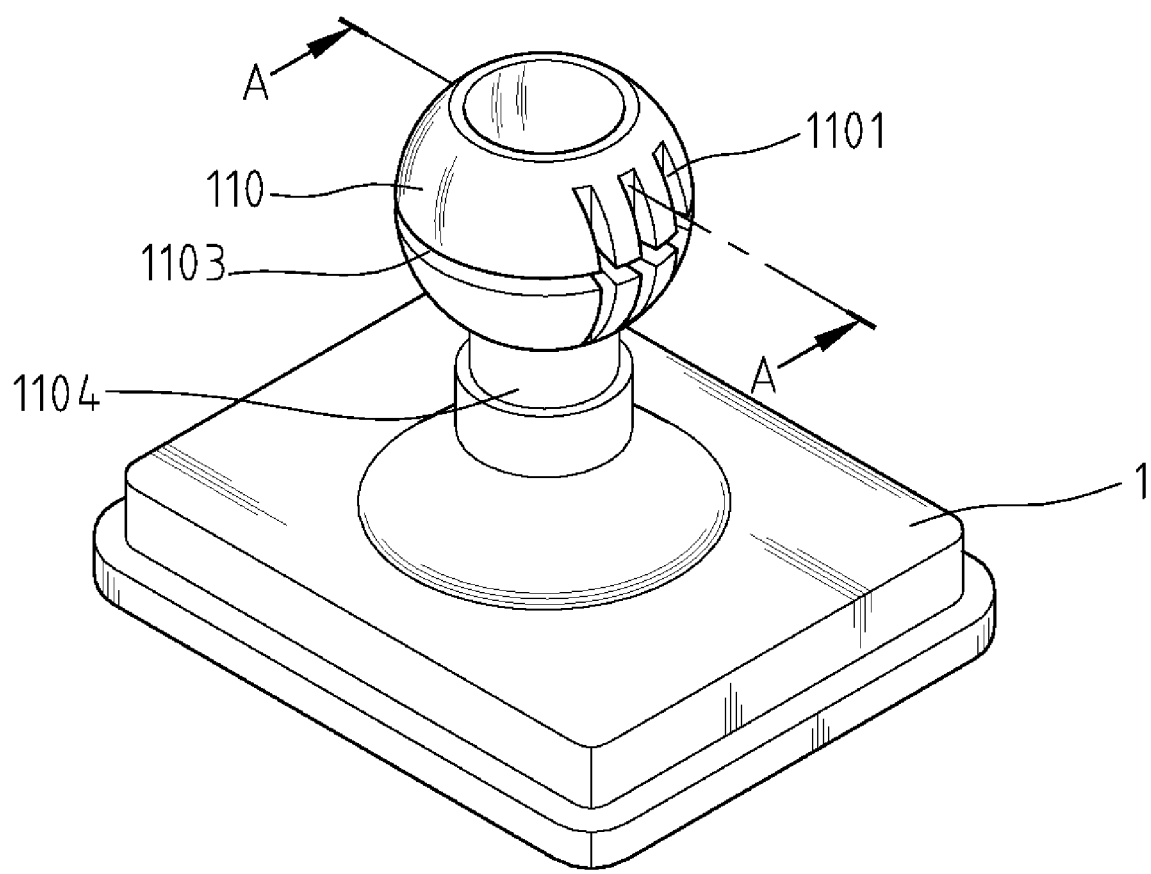
FIG. 5 shows an inner core layer of the connecting element of the present invention.
Figure 6:
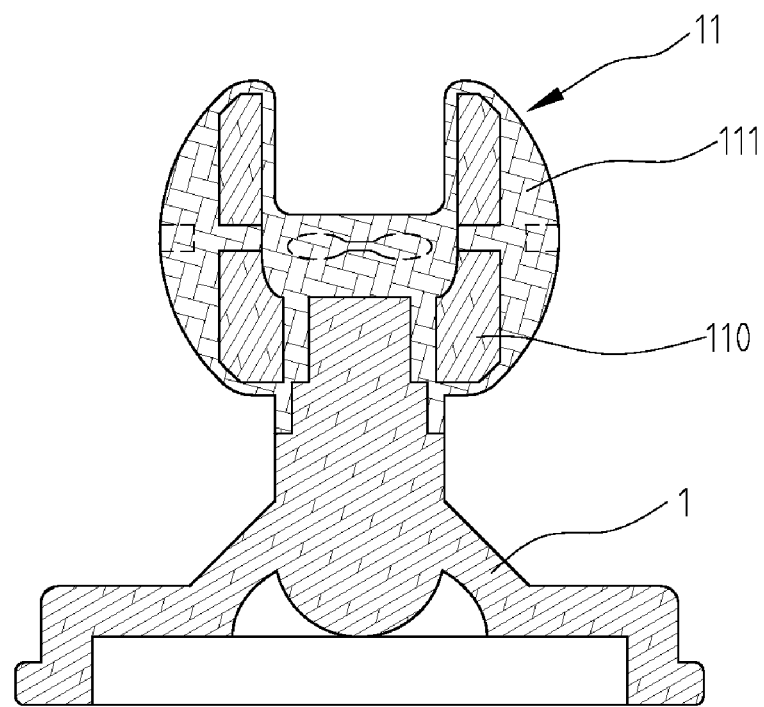
FIG. 6 shows a cross-sectional view of the connecting element of the present invention.
Figure 7:
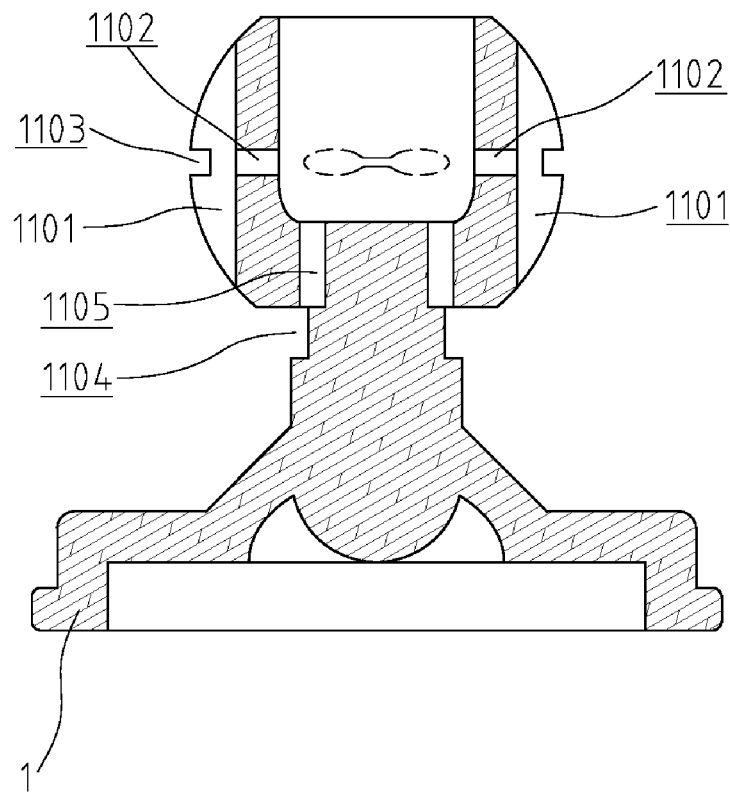
FIG. 7 shows a cross-sectional view of FIG. 5.

FIG. 5 shows an inner core layer 110 of connecting element 11 of connecting unit 1 formed by injection molding. Then, an injection molding method is applied again to form an outer covering layer 111 on inner core layer 110, as shown in FIG. 6. The final shape of connecting element 11 is shown in FIG. 4. Because inner core layer 110 is harder than outer covering layer 111, connecting element 11 includes two layers with different hardness. To prevent the disengagement of outer covering layer 111 from inner core layer 110 due to the fastening, inner core layer 110 is designed to enhance the engagement with outer covering layer 111. As shown in FIGS. 5 and 7, the main body of inner core layer 110 is a ball-shaped shell that is hollow in the center. The outer surface of inner core layer 110 includes a plurality of vertical first trenches 1101. Each first trench 1101 includes a lateral hole 1102 penetrating to the hollow center of inner core layer 110. The equator of outer surface of inner core layer 110 includes a ring-shaped second trench 1103. A ring-shaped third trench is included near the bottom of connecting element 11, where connecting element 11 is connected to the main body of connecting unit 1. A plurality of vertical holes 1105 penetrating to the hollow center of inner core layer 110 is also included near the bottom of connecting element 11. Therefore, when injection molding is used to form outer covering layer 111, the softer material will fill holes 1102, 1105, first trenches 1101, second trench 1103, and third trench 1104. In this manner, inner core layer 110 is buried inside outer covering layer 111 to prevent from disengagement under the fastening stress.

In the above embodiment, inner core layer 110 and outer covering layer 111 are made of different materials. Inner core layer 110 is made of plastic, and outer covering layer is made of rubber. Therefore, the outer layer of connecting element 11 is softer than the inner layer. However, a single material can also be used to form the two layers with different hardness, for example, by adding different hardening ingredient to the material for the first and the second injection moldings. Take PVC as an example. The PVC suppliers can provide PVC with different hardness. A harder PVC can be used in the first injection molding for the inner core layer, and a softer PVC can be used in the second injection molding for the outer covering layer. By using PVC with different hardness, connecting element 11 can have a harder inner layer and a softer outer layer.

Figure 8:
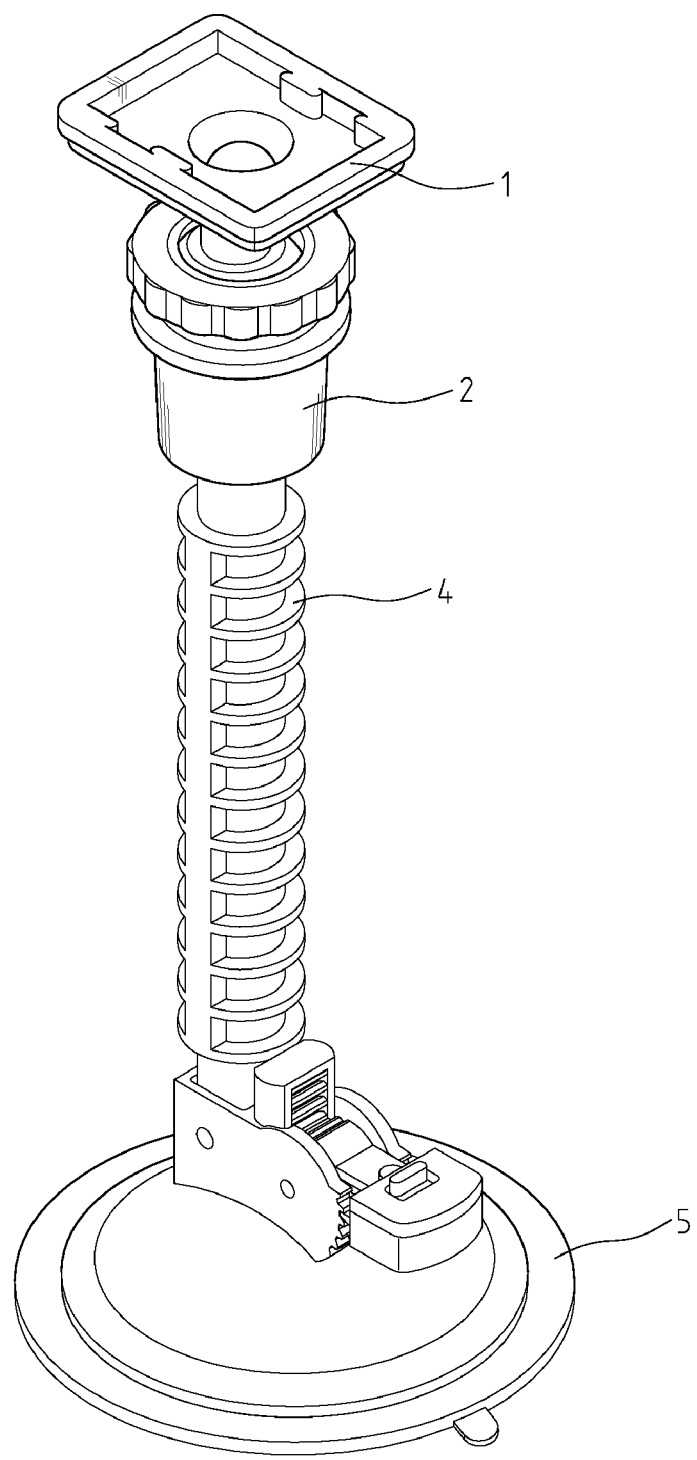
FIG. 8 shows a first embodiment of an application of the present invention.

FIG. 8 shows a first embodiment of an application of the present invention. As shown in FIG. 8, the present invention is used as a fixed supporting seat for a mobile phone or other electronic products in a vehicle. One end of connecting unit 1 is connected to a clipping seat for clipping the mobile phone. One end of encasing unit 2 is connected to a flexible supporting rod 4, which is further connected to a suction structure 5 to attach to the wind shield of the vehicle.

Figure 9:
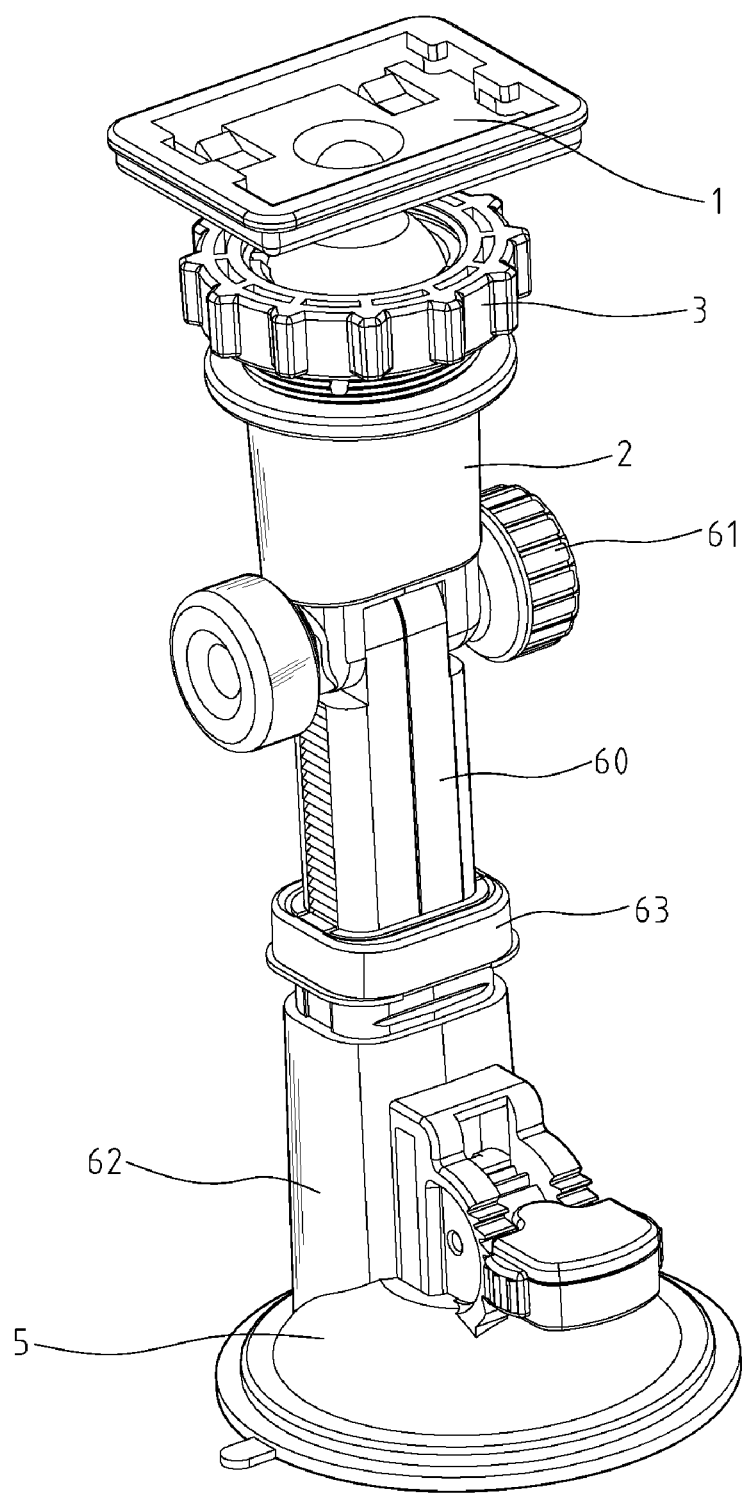
FIG. 9 shows a second embodiment of an application of the present invention.
Figure 10:
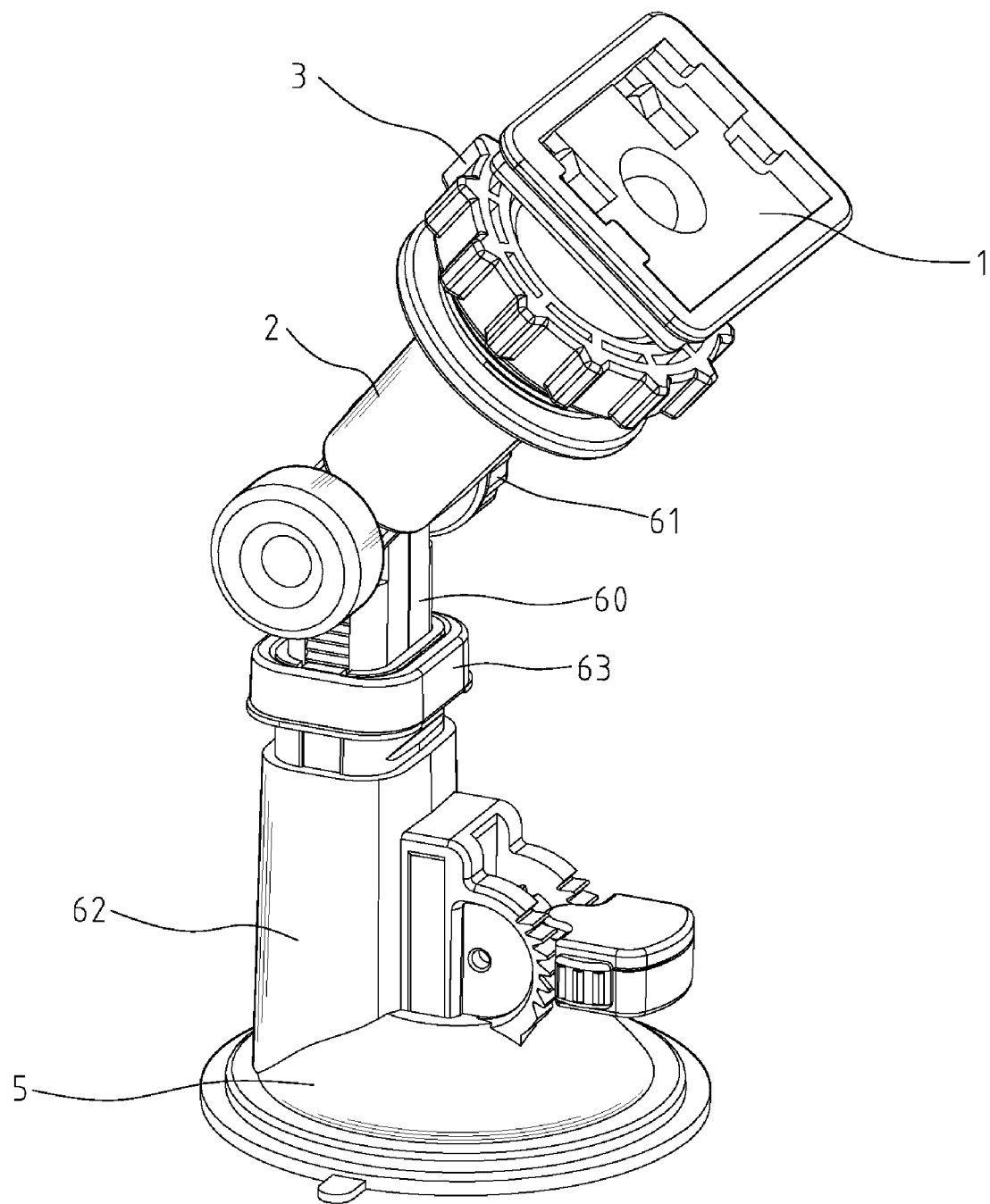
FIG. 10 shows a schematic view of the practical application of FIG. 9.

FIGS. 9 and 10 show a three-dimensional view and the actual use of a second embodiment of an application of the present invention, respectively. The present invention is also used as an auxiliary support seat for electronic products in a vehicle. One end of connecting unit 1 is connected to a clipping seat for clipping PDA, GPS, and so on. One end of encasing unit 2 is connected to a retractable rod 60. The tilting angle of encasing unit 2 can be adjusted by screw button 61. Retractable rod 60 is inserted in a base seat 62 at the top of a suction structure 5. When pushed down, buckle element 63 is in a release state and retractable rod 60 can be retracted into base seat 62. FIG. 10 shows the view after the retraction. As seen, the present invention can be applied to a plurality of practical applications, and is not limited to the embodiments described above.

In summary, the connector of the present invention includes a connecting element having two layers with different hardness. The outer layer is softer than the inner layer so as to increase the friction between the connecting element and the holding plates when fastened. In comparison, the present invention improves the fixation effect of a conventional ball-and-socket joint.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A structure for multi-directional connectors, comprising:
    a connecting unit, further comprising a ball-shaped connecting element at one end;
    an encasing unit, further comprising a plurality of holding plates forming a ball-shaped concave for seating said connecting element of said connecting unit, said holding plates having an outer surface formed with screw teeth; and
    a ring-shaped fastening unit, having inner wall formed with screw teeth for engaging with said screw teeth on the outer surface of said holding plates;
    wherein said connecting element is made of an inner core layer and an outer covering layer which is softer and larger than said inner core layer, said inner core layer being a ball-shaped shell with a hollow center and an outer surface comprising a plurality of vertical first trenches each having at least a hole penetrating to said hollow center of said inner core layer, and wherein
    said outer covering layer being connected to said inner core layer through each said hole.

2. The structure as claimed in claim 1, wherein said outer covering layer of said connecting element is softer than the inner surface of said holding plates of said encasing unit.

3. The structure as claimed in claim 1, wherein said connecting element is made of two different materials.

4. The structure as claimed in claim 1, wherein said outer covering layer covers said inner core layer and is connected through the holes of said first trenches.

5. The structure as claimed in claim 1, wherein said shell further comprises a ring-shaped second trench on said outer surface of said shell.

6. The structure as claimed in claim 1, wherein said shell further comprises a ring-shaped third trench near the bottom of said shell where said shell is connected to a main body of said connecting unit.

7. The structure as claimed in claim 6, wherein said third trench further comprises a plurality of holes penetrating to said hollow center of said inner core layer.

8. The structure as claimed in claim 7, wherein said covering layer covers said inner core layer and is connected through said holes of said third trench.

* * * * *